Feb. 21, 1939.   J. J. JAKOSKY   2,147,902
APPARATUS FOR DETERMINING PHOTOGRAPHIC EXPOSURES
Filed Jan. 31, 1936
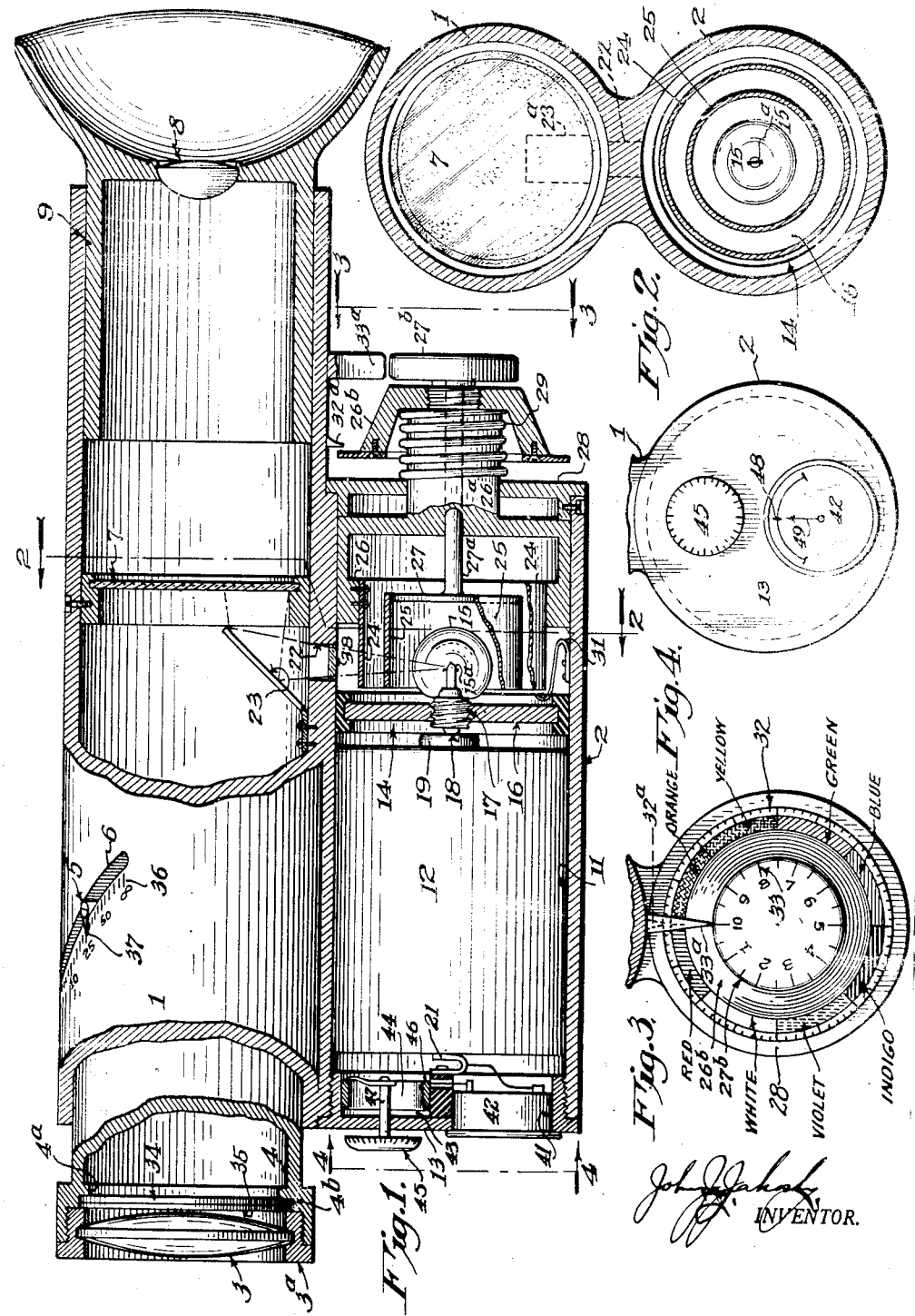

Patented Feb. 21, 1939

2,147,902

UNITED STATES PATENT OFFICE 2,147,902

APPARATUS FOR DETERMINING PHOTOGRAPHIC EXPOSURES

John Jay Jakosky, Los Angeles, Calif.

Application January 31, 1936, Serial No. 61,735

2 Claims. (Cl. 88—23)

This invention relates to an improvement in exposure meters and similar devices which are used for ascertaining a proper photographic exposure, and pertains particularly to an exposure meter which operates on a photometric principle, and to a method of determining photographic exposures whereby and wherein an illuminated area of controlled intensity and color is compared with an image of a desired portion of the photographic subject in such manner that a relatively true index of the photographic light-value of such subject is obtained.

The principal object of the present invention is to provide a method and apparatus for the rapid determination of photographic exposures within a smaller limit of error than has hitherto been obtainable. A further object of the invention is to provide a device of the character described which may be employed to determine the proper exposure for objects of different colors.

A further object of the invention is to provide a combined exposure meter and rangefinder which is free from errors arising from the personal equation of the observer or user. A further object of the invention is to provide an exposure meter which may easily be adjusted to determine the correct exposure of a photographic film or the like in accordance with the color sensitivity and "speed" of the particular film employed.

A further object of the invention is to provide a method and apparatus for the accurate determination of a photographic exposure by the visual comparison of the light emanating from the photographic subject with an illuminated area of comparable color, whereby the observer is enabled to compare the intensity of such emanated light with such illuminated area as a standard, without being required at the same time to make mental adjustment or compensation for material differences in color value therebetween.

A further object of the invention is to provide a method and apparaus for determining the proper or optimum exposure of a desired portion of a photographic subject irrespective of the average light intensity of the photographic subject as a whole.

Numerous types of exposure meters have been hitherto disclosed, such as the "dissolving" type, the "photoelectric" type, the filament type, and the like. Each of these types of meters is deficient in some respect, and while all are of assistance in arriving at optimum photographic exposures, being more dependable than the personal judgment of the average photographer, the deficiencies are of such magnitude as to make the use thereof fall more within the category of estimations of photographic exposures than determinations thereof. The importance of proper photographic exposure is more clearly appreciated at present than it has been in the past, due principally to the use of the so-called "miniature" camera, which takes pictures on such a scale as to be of little value to the photographer in the absence of subsequent photographic enlargement, and consequently the negative produced with such a camera must not only be such as to make a good "contact" print (in which a photographic paper of considerable latitude may be employed) but must also be such as to enable the production of a reasonably good enlargement (which necessitates the use of a printing paper of restricted latitude).

The "dissolving" type of exposure meter is dependent upon the threshold value of visibility of the user's eye, and hence the reading will vary from user to user, and with a particular user from time to time. This type of meter is also open to the objection that it is responsive to the average intensity of the field of view, and thus is not capable of accurate exposure determinations under all circumstances inasmuch as the readings must be interpreted by the user with respect to the light distribution in the photographic subject.

The "photoelectric" type of meter is objectionable from the standpoint of being dependent to a marked degree upon the relatively low response of a photoelectric element, which restricts the use thereof to well-illuminated subjects, and because of such low response such meters are normally arranged to gather light over a relatively large area, and are thus subject to the latter-mentioned objections of the "dissolving" type of meter.

The "filament" type of meter, which depends upon the comparison of the intensity of a filament or the like with the photographic subject by superimposing a glowing filament or an image thereof upon a "sight" of the photographic subject, is objectionable from the standpoint of variations in the color of the filament which accompany the variations in the intensity of illumination of the filament, thus rendering the matching of the filament intensity with the subject intensity relatively difficult. Furthermore, all of the above-described hitherto proposed types of exposure meters are subject to a relatively large error in not providing compensation for the color of the object itself.

The device of the present invention comprises, essentially, an image producing means which may be directed toward the photographic subject and caused to establish an image thereof in position to be viewed by the user, means for establishing an illuminated control area adjacent said image, and, more specifically, adjacent a desired portion of such image, and means for varying the intensity and color of the illuminated control area to approximate the intensity and color of an adjacent portion of such image.

The method of the present invention comprises, essentially, the production of an image of a photographic subject on a viewing screen means in position to be observed by the user of the device, producing an illuminated area of controlled color-value and light-intensity adjacent a portion of such image, and balancing the relative color-value and intensity of said image and said illuminated area. The method of the present invention also contemplates the employment of compensating filter-means in association with the subject image, whereby, for the determination of the correct exposure of a photosensitive surface of specific color-sensitivity and speed, a specific combination of color-and-intensity-modifying means are employed to modify the visual character of the subject image in conformity to such sensitivity and speed.

Other objects of the invention will be brought out in the following description of a preferred embodiment thereof, or will be apparent therefrom. The accompanying drawing illustrates such a preferred embodiment, and referring thereto:

Figure 1 is a longitudinal cross-section of the exposure meter of my invention;

Figure 2 is a transverse section thereof, taken on line 2—2 in Figure 1;

Figure 3 is a broken-away elevation of one end thereof taken on line 3—3 in Figure 1; and Figure 4 is a broken-away view of the other end thereof.

Referring to the drawing, the device of the present invention may comprise two cylindrical housings, preferably disposed in parallel alinement, one of said housings comprising a telescopic viewing member 1 and the other of said housings 2 including a light source provided with a source of electrical energy and certain control means peculiar to my invention.

The telescopic viewing means may comprise an objective lens 3 mounted in a lens barrel 4 slidably disposed on the housing 1 at one end thereof, and adapted to be moved longitudinally with respect to said housing upon relative rotation thereof through the agency of a fixed lug 5 on the barrel 4 engaging a helical slot 6 in the housing 1. At a suitable position rearwardly of the lens 3 I provide a ground-glass viewing screen 7 and at the other end of the housing 1 I provide a magnifying eye-lens 8 mounted within a suitable holder 9 which is preferably slidably mounted within said housing whereby variation in the eyes of different observers may be accommodated for to bring the surface of the ground-glass viewing screen 7 into relatively sharp focus.

The light housing 2 is preferably provided with a space 11 adapted to receive a battery 12, a removable plug or the like 13 being provided for ready removal of said battery. Rearwardly of the battery 12 I provide a base member 14, insulated from the housing 2 in the event that the said housing is of metal, said base member carrying a flashlight bulb 15 and comprising a metallic member 16 making electrical contact with the threaded portion 17 of the bulb base, the tip 18 of the bulb base making contact with the center pole 19 of the battery 12. The case of the battery may be grounded to the housing 2 through the agency of a contact clip 21 bearing against the forward end of said battery and electrically secured to the plug 13.

In line with the filament 15$^a$ of the lamp 15 I provide an aperture 22 extending through both housings 1 and 2, and within the housing 1 opposite this aperture I provide a reflecting element 23 positioned closely forwardly of the screen 7, in position to reflect light from the filament 15$^a$ onto a restricted area of said screen, as shown at 23$^a$ in Figure 2.

In position to act upon the light from the bulb 15 which falls on the screen 7, i. e., in the path of the light from 15$^a$ to 23$^a$, I provide two separate light-modifying screens 24 and 25, which may comprise, respectively, a color-modifying screen and an intensity-modifying screen. These screens may advantageously be formed as transparent cylinders of celluloid or the like. The screen 24 is preferably provided with a clear or uncolored space at one end and varies from red through indigo and violet in substantial accordance with the solar spectrum, and may be formed as a strip of material bent into cylindrical form and joined at the clear space to the red or violet ends of the strip, as the case may be. The intensity-modifying screen 25 may comprise a variable density screen which may be formed as a neutral grey toned strip which is relatively opaque at one end and varies gradually to a fully transparent screen at the other end. The transparent and relatively opaque ends may be joined together to produce the desired cylindrical member.

The two light-modifying screens are mounted for movement across the beam of light which impinges upon the reflector 23, and for this purpose may be disposed concentrically about the bulb 15 as shown, carried by suitable holders 26 and 27, the holder 26 being conveniently mounted for rotation within the housing 2 and provided with a hub portion 26$^a$ terminating in a thumb knob 26$^b$, and the holder 27 being provided with a shaft 27$^a$ journaled in the hub 26$^a$ and terminating in a thumb knob 27$^b$.

The rearward end of the housing 2 may be provided with a cover or plug 28, and the hub 26$^a$ may be slidably and rotatably mounted in said plug, and a suitable compression spring 29 may be provided in position to bias the knob 26$^b$ away from the plug 28, whereby electrical connection of the bulb 15 may be effected by forward pressure on the knob 27$^b$, forcing the holder 26 towards the base member 14, and a spring contact member 31 may be provided on the housing 2 in position to be engaged by the holder 26 and moved into contact with the base member 14 upon forward movement of the holder 26 and close the circuit to the bulb filament through the return circuit provided by the housing 2. If the housing 2 is made of a non-conductive material such as "Bakelite" or the like, it will be apparent that an alternative form of electrical contact and circuit means will be provided for energization of the filament 15$^a$, as by providing electrical connection between the contacts 21 and 31.

According to the method of the present invention, when the instrument is to be used to determine the correct exposure for a given or other photosensitive surface of normal sensitivity (neglecting for the moment the range of color sensitivity of that film) in the production of a photographic register of a conventional subject such as a person standing before a neutral-toned background, the telescopic viewing means is pointed at the person, and the barrel 4 rotated (by grasping the outer rim thereof) to bring the image of such person into sharp focus on the screen 7; the knob 27<sup>b</sup> may then be pressed to light the bulb 15, and a comparison of the intensity and color of the spot or area 23<sup>a</sup> with the pertinent portion of the subject image is then made. The knobs 26<sup>b</sup> and 27<sup>b</sup> may then be rotated, if necessary, with occasional illumination of the bulb, to substantially match the color and intensity of the spot 23<sup>a</sup> to said image portion, and when an equivalent illumination has been secured the correct exposure for the particular film at a given lens aperture may be determined from an empirical chart (supplied with the instrument) with reference to scale readings 32 and 33 associated with the two knobs 26<sup>b</sup> and 27<sup>b</sup>, suitable index pointers being provided if desired, as at 32<sup>a</sup> and 33<sup>a</sup>. For convenience, I find it preferable to mark the actual color on the scale 32 associated with the color-modifying screen 24 as shown by the color-simulating cross-hatching in Figure 3, whereby the user may partially adjust the instrument before it is held to the eye. For instance, when determining the proper exposure for a green object, the user places the index 32<sup>a</sup> on the green band on the scale 32 and then holds the instrument to the eye and views the image on the screen 7. He then adjusts the knob 26<sup>b</sup> to give the shade of green which most approximately matches the shade of green in the subject, and the knob 27<sup>b</sup> may then be rotated to balance the intensity of illumination of the spot 23<sup>a</sup> to the intensity of the subject image. The scale 33 for the intensity-modifying screen 25 may be in any desired arbitrary scale, and for convenience is numbered from 1 to 10 indicating the relative order of opaqueness of the periphery of the said screen 25.

In view of the fact that different films or other photosensitive surfaces are of different sensitivity to the various colors of the spectrum as well as of different "speeds", I prefer to employ compensating filters or color- and intensity-modifying screens in connection with the production of the image of the subject at the screen 7 so that the intensity of various portions of such image with respect to the color of the corresponding portions of the subject itself will appear to the eye of the observer in a relation comparable to the relation in which the film will respond to the actual colors of such portions. When such compensation is employed, a single empirical chart may be employed to calculate the correct exposure, given a particular setting for the scales 32 and 33, for all available films providing the correct compensating filters are employed in relation to the subject image. The above-mentioned compensating filters may be and preferably are disposed along the axis of the lens 3, forwardly of the screen 7, as by providing a shoulder 4<sup>a</sup> internally of the barrel 4, defining a recess 4<sup>b</sup> between the rearward end of the lens mount 3<sup>a</sup> and said shoulder. The lens mount 3<sup>a</sup> may be threadedly disposed within the barrel 4, and may be unscrewed to permit insertion of one or more filters, as at 34 and 35. A plurality of filters may be supplied with the instrument, graduated in color and density, respectively, to provide color- and intensity-compensation for a number of different films, the proper combination of filters being inserted at 4<sup>b</sup> to compensate for the particular film employed, as will be apparent to one skilled in the art.

The focal adjustment of the lens 3 with respect to the ground-glass 7 is preferable, but not essential, inasmuch as it has been determined that slight departures from a true focus will not materially affect the intensity of illumination of the image at 7. At the same time, I prefer to provide the above-mentioned focussing mount for said lens, and in connection therewith an important feature is realized. It will be appreciated that the average user will prefer to focus the subject image at 7, by rotating the barrel 4 with respect to the housing 1, and after having done so, the established position of the lens may be relied upon to furnish a very accurate index of the distance of the subject from the observer, at least within the tolerance of the "depth of focus" of the camera lens employed, if the aperture of the lens 3 is selected at a larger value than the aperture of such camera lens. As shown in Figure 1, a distance scale (which may read in feet or meters) may be provided as at 36 along the slot 6 in the housing 1, and a suitable marker may be provided on the lug 5 as at 37. Any object which is in focus on the screen 7 would thus be in focus on the camera film if the camera lens were set at the same distance reading as that indicated at 36—37.

In view of the fact that conventional lamp filaments emit a light which is stronger at the red end of the spectrum than is daylight, I preferably employ a blue-glass filter of the so-called "day-light" grade between the bulb 15 and the reflector 23, as at 38, or more preferably, provide a bulb fabricated of glass of this color (comparable to the "day-light Mazda" bulbs commercially obtainable in the higher wattages).

I also prefer that the temperature of the filament 15<sup>a</sup> be maintained at a constant temperature level for successive observations with the instrument, and for this reason, I prefer to provide a battery 12 of somewhat higher voltage than such filament, in conjunction with a variable resistor, whereby the current flow in said filament may be established at a specific value. Referring to Figures 1 and 4, the plug 13 may be provided with a recess 41 adapted to receive an ammeter 42, and a recess 43 adapted to receive a variable rheostat 44 provided with a hand-knob 45 projecting forwardly of the device through the said plug. The contact 21 may be connected to one binding-post of the ammeter 42, and the other binding-post may be connected to one end of the resistance coil 46 of the rheostat 44, the contact arm of which may ground to the plug 13 through the shaft 47, thus providing the return circuit for the lamp 15. According to this arrangement, the ammeter 42 and the resistance 46 are in series with said lamp, and a suitable indication may be provided on the scale of said ammeter as at 48, indicating the correct current flow for the filament. The aging of the battery may thus be accommodated for with very little difficulty, by the user himself, and as long as the battery has enough energy to bring the ammeter hand 49 to the designated mark, he will be sure of having the instrument in calibration.

It has been found, however, that the aging of the battery 12 is not unduly rapid, due to the comparatively short time during which the bulb 15 must be lighted for a given exposure determination, and if a bulb having a filament of the same voltage as a standard dry-cell is employed, a battery may be used for a relatively long period without impairing the accuracy of the meter unduly. In view of the above consideration, the current control means shown at 41 through 49 may be dispensed with, if desired, and the device may be calibrated by the user from time to time to determine when the battery should be replaced. Such calibration is relatively simple, within the limit of error required for ordinary photographic work, and may be accomplished by placing a common lamp, such as a 50 watt incandescent bulb, in position to shine on a piece of white letter paper from a fixed distance such as one foot, establishing an image of the illuminated paper on the ground-glass 7 of the instrument in the conventional manner, while shielding the objective lens from the direct light of the lamp. This is done when the instrument is provided with a fresh battery, the angle of the paper with respect to the light and the instrument is noted, the comparison spot 23ª adjusted to balance the intensity and color of the image and the readings of the scales 32 and 33 noted. When it is desired to check the luminosity of the lamp or bulb 15, it is merely necessary to set the scales 32 and 33 at the noted readings, establish and view the lamp and paper in their previous relation, moving the lamp away from the paper sufficiently to produce a balance between the image of the paper and the comparison spot. The ratios of the standard and test distances of the lamp from the paper will, according to the inverse-square law of optics, give a measure of the loss in intensity of the bulb 15. When this bulb has dropped lower than ten per cent below the original value, it is best to replace the battery with a fresh one.

It will be comprehended that I do not choose to be limited to the specific structure herein delineated and described, but contemplate any such modifications thereof as will occur to one skilled in the art, within the scope of the appended claims. For example, it is not essential that the light-emitting source 15ª be disposed at the side of the viewing device, and the light therefrom reflected onto the ground-glass viewing screen, inasmuch as it is entirely feasible to dispose the bulb 15 within the housing 1, either forwardly or rearwardly of the screen 7. Thus, the bulb 15 and the associated screens 24 and 25 may be placed closely adjacent the forward face of said screen, suitably masked so as to cause a small illuminated area to appear thereon adjacent the image of the photographic subject, or the bulb and screen assembly may be placed rearwardly of said screen in position to shine forwardly upon an opaque light-reflecting area thereon, whereby the eye-lens 8 would view the subject image by transmitted light and the comparison spot by reflected light, suitable means being provided in either case for the proper movement of the light-modifying screens 24 and 25 so as to control the color and intensity of illumination at such comparison spot.

Similarly, the variation in relative intensity between the image and the comparison area may be effected by establishing the intensity of such comparison area at a constant level, as by using a constant intensity light source, and varying the intensity of the image itself, as through the agency of a variable aperture iris diaphragm located adjacent the objective lens in the telescopic means.

In like manner, modifications may be made in the character of the color-modifying screen 24, as determined by the degree of precision desired in the instrument. It will be appreciated that not all colors occurring in nature will be subject to matching with a portion of a solar spectrum, inasmuch as colors in nature frequently contain, in some degree, all three of the fundamental colors red, green and violet. The spectrum arrangement of colors herein described, will, however, permit quite accurate determination of photographic exposures, and if more precision is required, an auxiliary movable color-modifying screen of a brown tone, varying from a dense to a light shade, may be placed in the path of the comparison beam. Alternatively, the color-modifying screen 24 may be mounted on a holder adapted for axial as well as rotational movement, and a brown tone superimposed upon the spectrum and varying axially from dark to light or clear. For amateur use, the color-modifying screen 24 may comprise a plurality of bands of typical colors occurring in nature, each band varying in tone from one end to the other, so that a close approximation of color may be effected for all the colors which are frequently met with. Where the superimposed brown and spectrum screens are employed, three control devices and a three-coordinate empirical data-sheet are required, however, and for general use it will be found that the spectrum or banded types of screens will be adequate, requiring the use of only a two-coordinate chart.

I claim:

1. An exposure meter for use in determining the optimum exposure of a photosensitive surface with reference to an illuminated subject, which comprises: an image-forming device including an objective lens and an eye lens and provided with viewing screen means intermediate said lenses; means for varying the distance between said viewing screen means and said objective lens to facilitate establishment of an image of a photographic subject in focus on said screen means; a light-emitting member positioned to one side of the axis defined by said image-forming device; reflecting means positioned to receive light from said light-emitting means and to project the same onto said viewing screen means adjacent the image of said subject formed by said image-forming means; a cylindrical color-modifying screen having a portion of its periphery continuously disposed between said light-emitting means and said reflector means, said screen comprising a transparent member mounted for rotation about its axis and having colored portions varying from red through indigo and violet in substantial accordance with the solar spectrum; means for rotating said screen whereby a desired portion of the periphery thereof may be imposed between said light-emitting means and said reflector to vary the color value of the light projected by said reflector means onto said viewing screen means; and means for varying the relative intensity of said image and said projected light to establish a balance therebetween.

2. The invention set forth in claim 1, said means for varying the relative intensity of said image and said projected light comprising a cylindrical intensity-modifying screen disposed concentrically with respect to said color-modifying screen and rotatably movable independently thereof, said intensity-modifying screen having portions of its periphery continuously disposed between said light-emitting means and said reflector means, and including means for rotating the same to establish said intensity balance between said image and said projected light.

JOHN JAY JAKOSKY.